United States Patent
Suzuki et al.

(10) Patent No.: US 8,625,203 B2
(45) Date of Patent: Jan. 7, 2014

(54) ZOOM LENS, OPTICAL APPARATUS HAVING SAME, AND METHOD OF MANUFACTURING ZOOM LENS

(75) Inventors: Takeshi Suzuki, Yokohama (JP); Haruo Sato, Kawaguchi (JP)

(73) Assignee: Nikon Corporation, Tokyo (JP)

(*) Notice: Subject to any disclaimer, the term of this patent is extended or adjusted under 35 U.S.C. 154(b) by 232 days.

(21) Appl. No.: 13/002,984

(22) PCT Filed: May 12, 2009

(86) PCT No.: PCT/JP2009/058862
§ 371 (c)(1),
(2), (4) Date: Jan. 7, 2011

(87) PCT Pub. No.: WO2010/004806
PCT Pub. Date: Jan. 14, 2010

(65) Prior Publication Data
US 2011/0116174 A1    May 19, 2011

(30) Foreign Application Priority Data

Jul. 9, 2008  (JP) .................................. 2008-178668
Jul. 9, 2008  (JP) .................................. 2008-178670

(51) Int. Cl.
  *G02B 15/14* (2006.01)
(52) U.S. Cl.
  USPC .......................................... 359/687; 359/676
(58) Field of Classification Search
  USPC .................. 359/676, 680–682, 687
  See application file for complete search history.

(56) References Cited

U.S. PATENT DOCUMENTS

2005/0083584 A1 *  4/2005  Ito et al. ..................... 359/687
2008/0019018 A1    1/2008  Ito

FOREIGN PATENT DOCUMENTS

| CN | 101109843 A | 1/2008 |
| EP | 1 881 357 A1 | 1/2008 |
| JP | 09-230235 A | 9/1997 |
| JP | 2004-258509 A | 9/2004 |
| JP | 2005-107280 A | 4/2005 |
| JP | 2008-026558 A | 2/2008 |
| JP | 2008-152049 A | 7/2008 |

OTHER PUBLICATIONS

Office Action issued Aug. 31, 2012 in Chinese Patent Application No. 200980126899.9.

* cited by examiner

*Primary Examiner* — James Greece
(74) *Attorney, Agent, or Firm* — Miles & Stockbridge P.C.

(57) ABSTRACT

The zoom lens is configured having, in order from an object, a first lens group (G1) having positive refractive power, a second lens group (G2) having negative refractive power, a third lens group (G3) having positive refractive power, and a fourth lens group (G4) having positive refractive power. The distance between each lens group is changed upon zooming from a wide-angle end state to a telephoto end state, the third lens group (G3) has, in order from the object, a thirty first lens group (G31) having positive refractive power (positive lens group), and a thirty second lens group (G32) having negative refractive power (negative lens group), the thirty second lens group (G32) is moved so as to have components orthogonal to the optical axis, and the condition of the expression $2.6<|X1|/fw<8.0$ is satisfied, where X1 denotes a moving distance of the first lens group (G1) upon zooming from the wide-angle end state to the telephoto end state, and fw denotes a focal length of the zoom lens in the wide-angle end state.

25 Claims, 10 Drawing Sheets

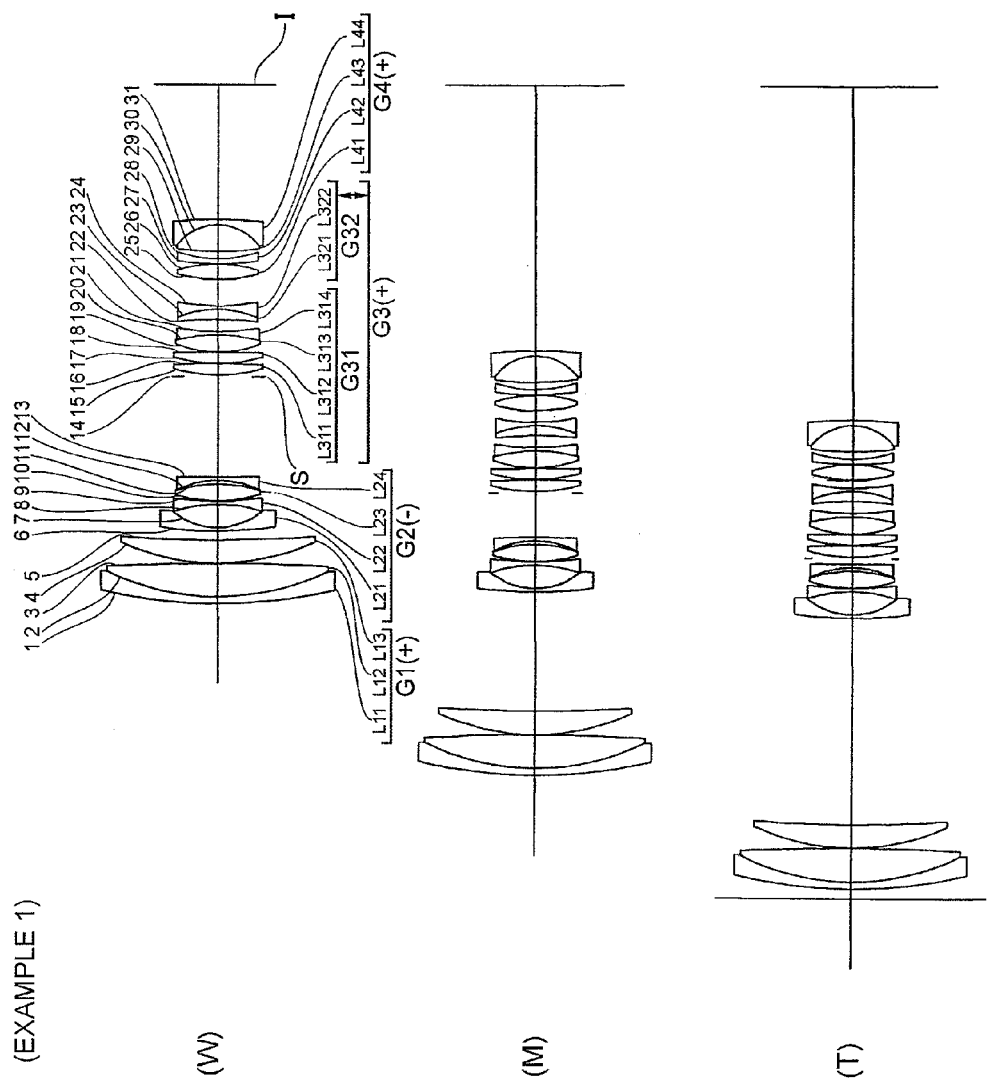

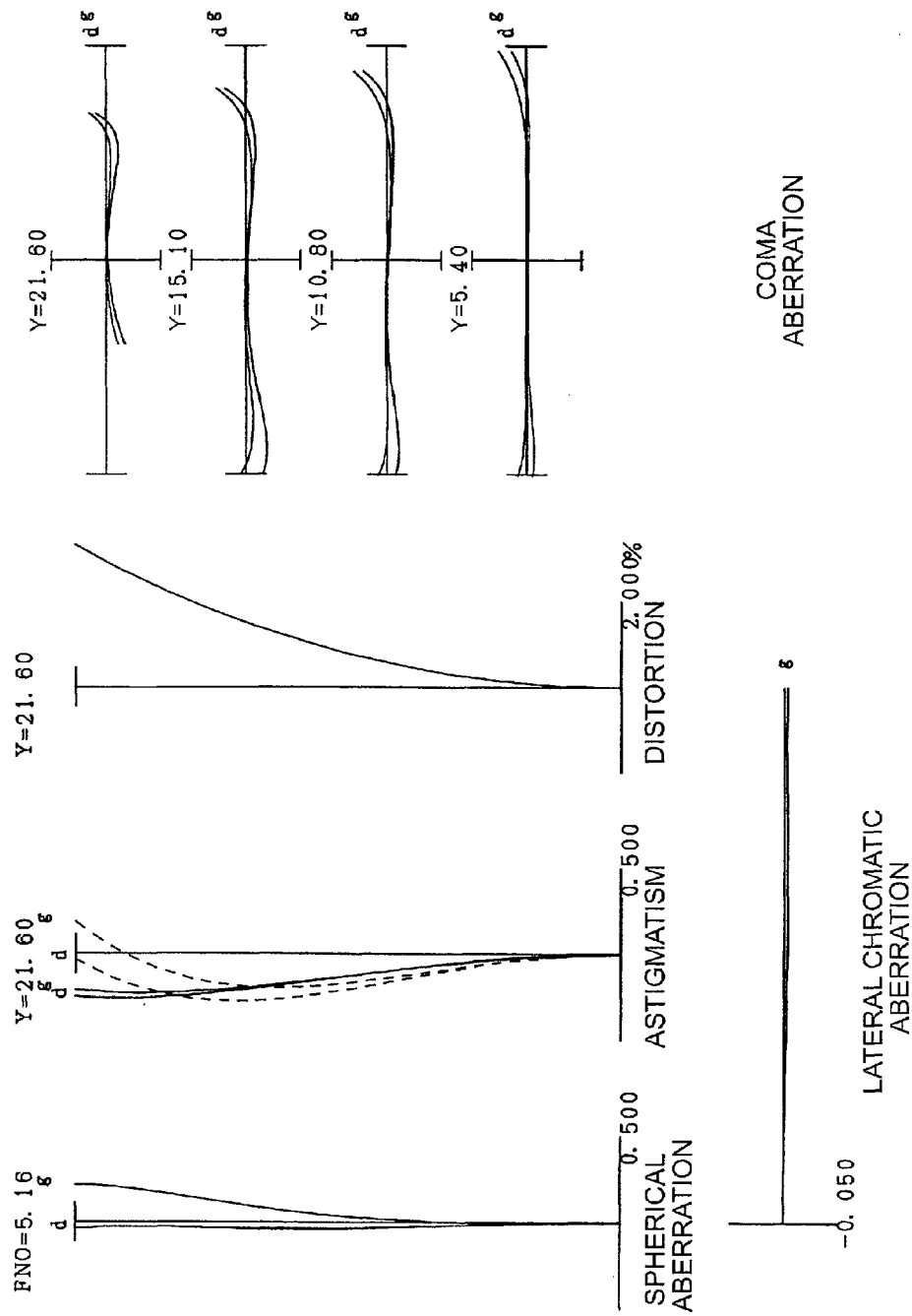

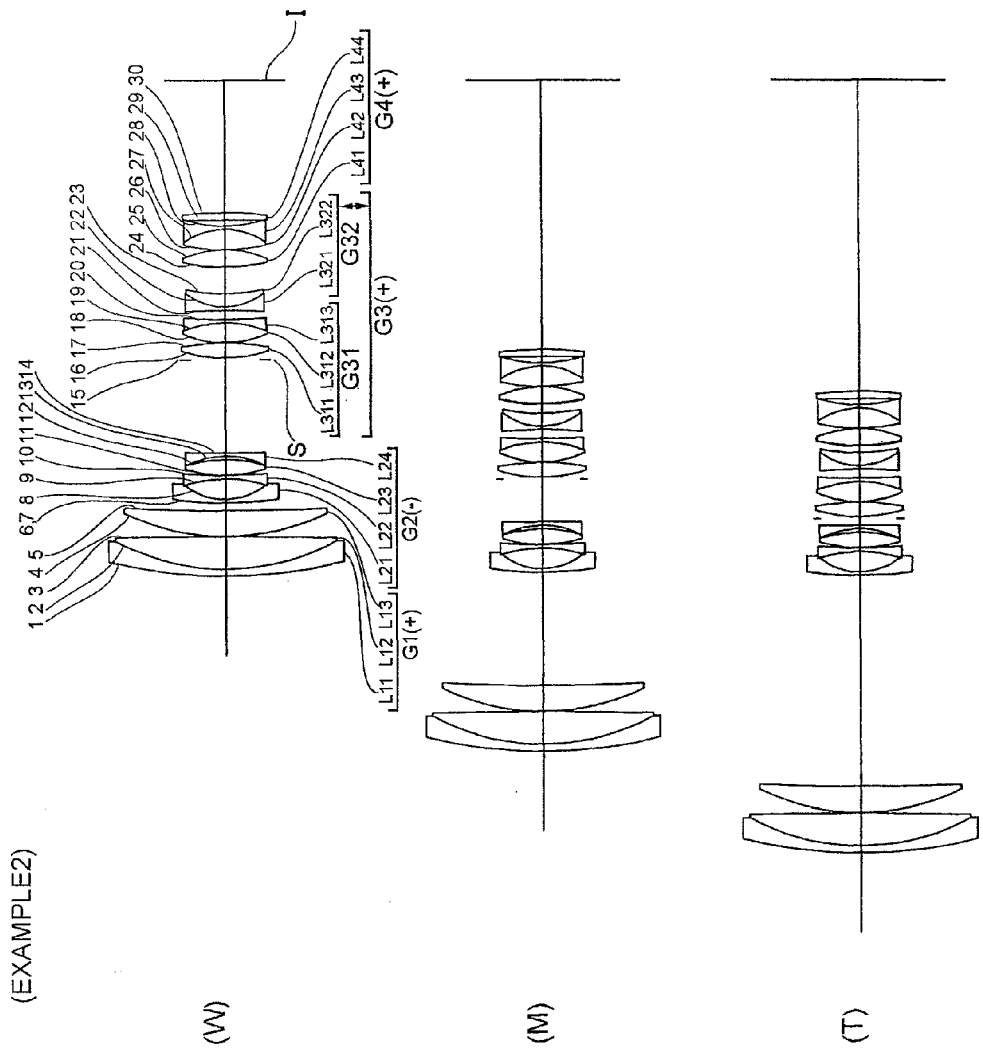

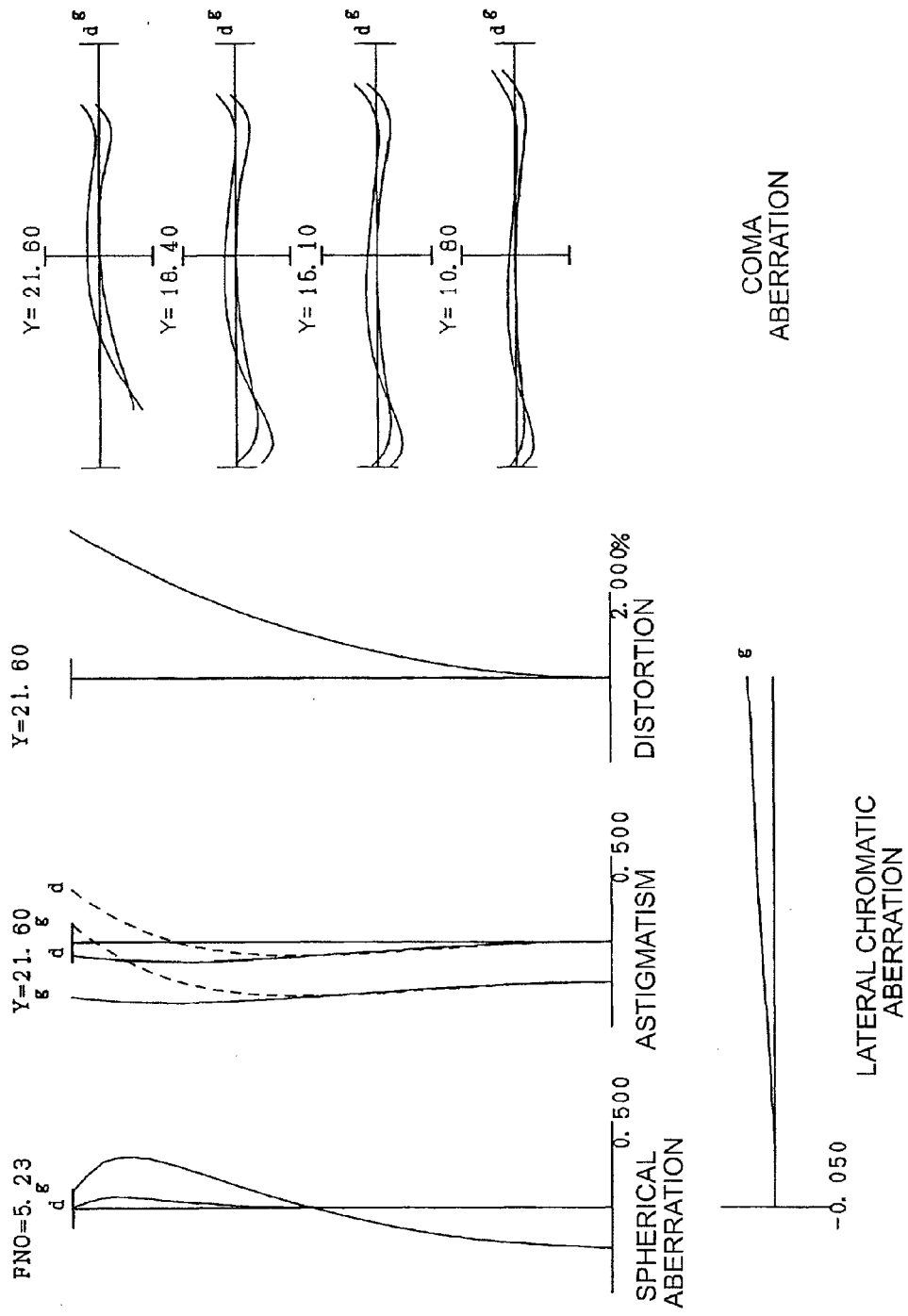

COMA ABERRATION

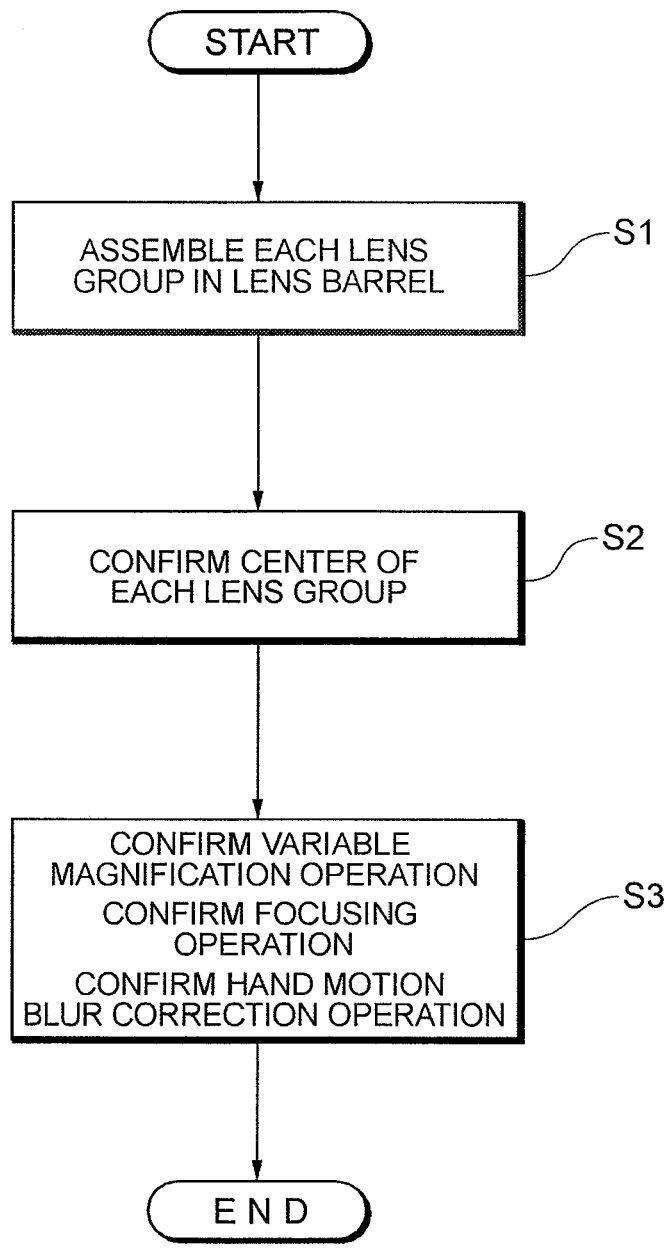

ZOOM LENS, OPTICAL APPARATUS HAVING SAME, AND METHOD OF MANUFACTURING ZOOM LENS

TECHNICAL FIELD

The present invention relates to a zoom lens, an optical apparatus having this zoom lens, and a method of manufacturing the zoom lens.

TECHNICAL BACKGROUND

Because of the recent advances in optical design and manufacturing technologies, zoom lenses have progressed to smaller sizes and higher variable powers. However the increase in the focal length in the telephoto end state, due to increasing the variable power, has made problems with hand motion blur more conspicuous. For hand motion blur, various zoom lenses having hand motion blur correction functions have been proposed (see e.g., Patent Document 1).

CITATION LIST

Patent Document

Patent Document 1: Japanese Laid-Open Patent Publication No. H9-230235

SUMMARY OF INVENTION

Problems to be Solved by the Invention

With the conventional zoom lenses having hand motion blur correction functions, however, optical performance deteriorates considerably if variable power is increased while maintaining the hand motion blur function.

With the foregoing in view, it is an object of the present invention to provide a zoom lens which can shift images using a movable optical system so as to have components orthogonal to the optical axis, and can correct hand motion blur, where an appropriate moving distance is set when zooming so that deterioration of performance is minimized while increasing variable power, an optical apparatus having this zoom lens, and a method of manufacturing the zoom lens.

Means to Solve the Problems

To achieve this object, a zoom lens of the present invention has, in order from an object, a first lens group having positive refractive power, a second lens group having negative refractive power, a third lens group having positive refractive power, and a fourth lens group having positive refractive power, wherein a distance between each lens group is changed upon zooming from a wide-angle end state to a telephoto end state. The third lens group further comprises, in order from the object, a positive lens group having positive refractive power and a negative lens group having negative refractive power, and has a configuration to move the negative lens group provided with components orthogonal to the optical axis, and the following conditional expression is satisfied: $2.6<|X1|\mathrm{fw}<8.0$, where X1 denotes a moving distance of the first lens group upon zooming from the wide-angle end state to the telephoto end state, and fw denotes a focal length of the zoom lens in the wide-angle end state.

It is preferable that the following conditional expression is satisfied: $0.38<(-f2)/f3<0.50$, where f2 denotes a focal length of the second lens group, and f3 denotes a focal length of the third lens group.

Another zoom lens according to the present invention has, in order from an object, a first lens group having positive refractive power, a second lens group having negative refractive power, a third lens group having positive refractive power, and a fourth lens group having positive refractive power, and a distance between each lens group is changed upon zooming from a wide-angle end state to a telephoto end state. The third lens group has, in order from the object, a positive lens group having positive refractive power and a negative lens group having negative refractive power, and has a configuration to move the negative lens group provided with components orthogonal to the optical axis, and the following conditional expression is satisfied: $0.38<(-f2)/f3<0.50$, where f2 denotes a focal length of the second lens group, and f3 denotes a focal length of the third lens group.

It is preferable that the following conditional expression is satisfied: $3.5<f1/\mathrm{fw}<5.0$, where f1 denotes a focal length of the first lens group, and fw denotes a focal length of the zoom lens in the wide-angle end state.

It is preferable that the negative lens group is a cemented lens of a biconcave negative lens and a positive lens.

It is preferable that the negative lens group has an aspherical surface.

It is preferable that the negative lens group has a negative lens and the negative lens has an aspherical surface.

It is preferable that the negative lens group is a cemented lens of, in order from the object, a biconcave negative lens and a positive meniscus lens having a convex surface facing the object, or a cemented lens of, in order from the object, a positive meniscus lens having a convex surface facing the image and a biconcave negative lens.

It is preferable that the fourth lens group has a positive lens disposed closest to the object and at least one cemented lens.

It is preferable that the first lens group, the third lens group and the fourth lens group move to the object side upon zooming from the wide-angle end state to the telephoto end state.

It is preferable that, upon zooming from the wide-angle end state to the telephoto end state, the distance between the first lens group and the second lens group increases, the distance between the second lens group and the third lens group decreases, and the distance between the third lens group and the fourth lens group changes.

It is preferable that the air space between the third lens group and the fourth lens group in the wide-angle end state is greater than the air space between the third lens group and the fourth lens group in the telephoto end state.

An optical apparatus of the present invention comprises the Above mentioned zoom lens.

A method of manufacturing a zoom lens according to the present invention has: a step of disposing in a lens barrel, in order from an object, a first lens group having positive refractive power, a second lens group having negative refractive power, a third lens group having positive refractive power, and a fourth lens group having positive refractive power, and assembling these lens groups so that the distance between each lens group is changed, upon zooming from a wide-angle end state to a telephoto end state; and a step of constructing the third lens group by disposing, in order from the object, a positive lens group having positive refractive power and a negative lens group having negative refractive power, and assembling the same so that the negative lens group provided with components orthogonal to the optical axis moves. In the assembling step, the following expression is satisfied: $2.6<|X1|\mathrm{fw}<8.0$, where X1 denotes a moving distance of the first lens group upon zooming from the wide-angle end state to the telephoto end state, and fw denotes a focal length of the zoom lens in the wide-angle end state.

It is preferable that in the abovementioned manufacturing method the following conditional expression is satisfied: $0.38<(-f2)/f3<0.50$, where f2 denotes a focal length of the second lens group, and f3 denotes a focal length of the third lens group.

Another method of manufacturing a zoom lens according to the present invention comprises a step of disposing, in order from an object, a first lens group having positive refractive power, a second lens group having negative refractive power, a third lens group having positive refractive power, and a fourth lens group having positive refractive power, and assembling them so that the distance between each lens group changes upon zooming from a wide-angle end state to a telephoto end state, and the assembling step further comprises a step of constructing the third lens group by disposing, in order from the object, a positive lens group having positive refractive power and a negative lens group having negative refractive power, and assembling them so that the negative lens group moves to have components orthogonal to the optical axis. The following conditional expression is satisfied: $0.38<(-f2)/f3<0.50$, where f2 denotes a focal length of the second lens group, and f3 denotes a focal length of the third lens group.

In the method of manufacturing a zoom lens according to the present invention as well, it is preferable that various configurations of the zoom lens can be implemented.

Advantageous Effects of the Invention

According to the present invention, a zoom lens which can shift images using a movable optical system, so as to have components orthogonal to the optical axis, and correct hand motion blur, where an appropriate moving distance is set upon zooming so that deterioration of performance is minimized while increasing variable power, and an optical apparatus having this zoom lens, and a method of zooming, can be provided.

BRIEF DESCRIPTION OF THE DRAWINGS

FIG. 1 illustrates a diagram depicting a configuration of a zoom lens according to Example 1;

FIG. 3 illustrates graphs showing various aberrations of the zoom lens according to Example 1 upon focusing on infinity in the intermediate focal length state;

FIG. 5 illustrates a diagram depicting a configuration of a zoom lens according to Example 2;

FIG. 7 illustrates graphs showing various aberrations of the zoom lens according to Example 2 upon focusing on infinity in the intermediate focal length state;

FIG. 10 illustrates a flow chart depicting a method of manufacturing the zoom lens.

DESCRIPTION OF EMBODIMENTS

Figure 2A:
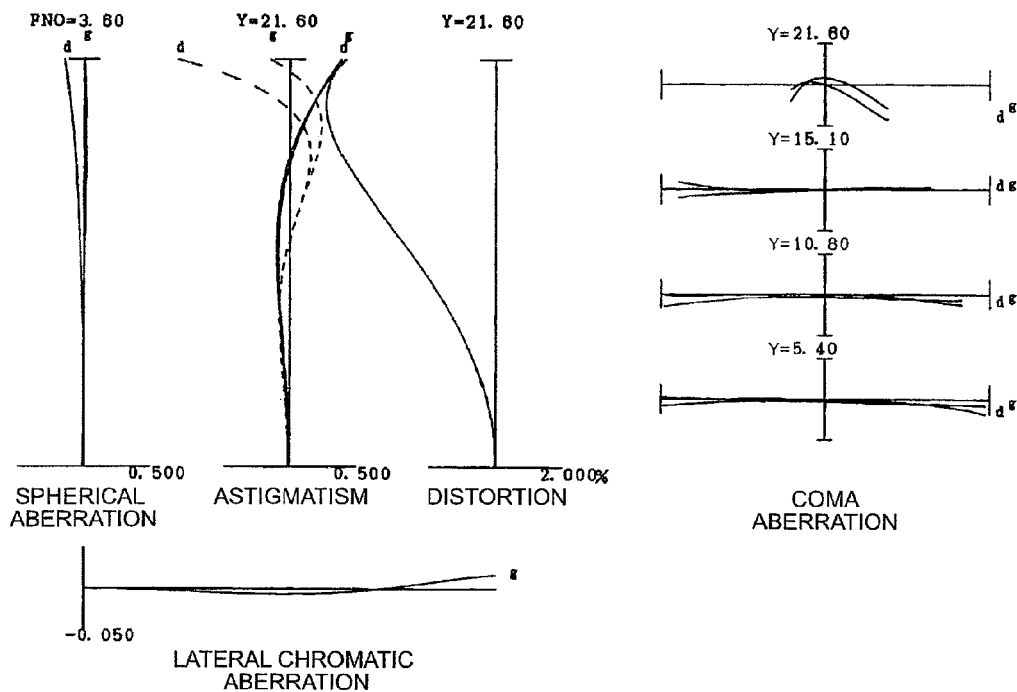
FIG. 2A and FIG. 2B illustrate graphs showing various aberrations of the zoom lens according to Example 1 upon focusing on infinity in the wide-angle end state, and graphs showing coma aberrations when a 0.59° rotation blur is corrected.

Preferred embodiments of the invention will now be described with reference to the drawings. As FIG. 1 shows, a zoom lens according to the present embodiment has, in order from an object, a first lens group G1 having positive refractive power, a second lens group G2 having negative refractive power, a third lens group G3 having positive refractive power, and a fourth lens group G4 having positive refractive power, and upon zooming from a wide-angle end state to a telephoto end state, the distance between the first lens group G1 and the second lens group G2 increases, the distance between the second lens group G2 and the third lens group G3 decreases, and the distance between the third lens group G3 and the fourth lens group G4 changes, and the third lens group G3 further has, in order from the object, a thirty first lens group G31 having positive refractive power and a thirty second lens group G32 having negative refractive power, and an image plane, when a hand motion blur is generated, is corrected by moving the thirty second lens group G32 so as to have components orthogonal to the optical axis.

The third lens group G3, of which lens diameter can be decreased more easily than the other lens groups, is appropriate to enclose a vibration isolation mechanism. Therefore even if a vibration isolation mechanism is enclosed in the lens barrel, the size of the lens barrel does not increase. The third lens group G3 has the thirty first lens group G31 having positive refractive power and the thirty second lens group G32 having negative refractive power, and the thirty second lens group G32 is used as the vibration isolation lens group, whereby the vibration isolation mechanism can be smaller and the vibration isolation lens group can be lighter. By distributing appropriate refractive power to the third lens group G3, deterioration of the image forming performance can be decreased when the thirty second lens group G32, which is the vibration isolation lens group, is moved so as to have components orthogonal to the optical axis.

According to the present embodiment, in the above mentioned configuration, the following conditional Expression (1) is satisfied, where X1 denotes a moving distance of the first lens group G1 upon zooming from the wide-angle end state to the telephoto end state, and fw denotes a focal length of the zoom lens in the wide-angle end state. The sign of the moving distance X1 is positive when the position of the first lens group G1 in the telephoto end state is located toward the object side from an origin, which is a position of the first lens group G1 on the optical axis in the wide-angle end state.

$$2.6<|X1|/fw<8.0 \tag{1}$$

Conditional Expression (1) satisfies an appropriate moving distance X1 of the first lens group G1 upon zooming from the wide-angle end state to the telephoto end state in order to ensure high magnification. If the condition exceeds the upper limit value of the conditional Expression (1), the moving distance of the first lens group G1 with respect to zooming increases, and the quantity of light in the telephoto end state decreases. As a result, the total length and diameter of the zoom lens increase, which makes it difficult to render this zoom lens into practical use. Fluctuation of the spherical aberration also increases, which is not desirable. If the condition is below the lower limit value of the conditional Expression (1), on the other hand, the moving distance of the first lens group G1 with respect to zooming decreases too much, and it becomes necessary to relatively increase the power of the first lens group G1, or to implement the zooming effect by another lens group, and as a result, fluctuation of the image plane and the deterioration of spherical aberration in the telephoto end state become conspicuous, which is not desirable.

To ensure the effect of the present embodiment, it is preferable that the upper limit value of the conditional Expression (1) is 5.0. To further ensure the effect of the present embodiment, it is preferable that the upper limit value of the conditional Expression (1) is 3.5. To even further ensure the effect of the present embodiment, it is preferable that the upper limit value of the conditional Expression (1) is 3.0. To ensure the effect of the present embodiment, it is preferable that the lower limit value of the conditional Expression (1) is 2.8.

In the present embodiment, it is preferable that the conditional Expression (2) is satisfied, where f2 denotes a focal length of the second lens group G2, and f3 denotes a focal length of the third lens group G3.

$$0.38 < (-f2)/f3 < 0.50 \quad (2)$$

The conditional Expression (2) specifies an appropriate ratio of the focal length f2 of the second lens group G2 to the focal length f3 of the third lens group G3. If the condition exceeds the upper limit value of the conditional Expression (2), it becomes difficult to simultaneously correct the coma aberration in the wide-angle end state, spherical aberration in the telephoto end state, and fluctuation of the curvature of field when correcting hand motion blur, which is not desirable. If the condition, is below the lower limit value of the conditional Expression (2), on the other hand, refractive power of the second lens group G2 becomes relatively high, and deterioration of astigmatism and curvature of field in a wide-angle end state deteriorate considerably, which is not desirable.

In order to ensure the effect of the present embodiment, it is preferable that the upper limit value of the conditional Expression (2) is 0.48. To further ensure the effect of the present embodiment, it is preferable that the upper limit value of the conditional Expression (2) is 0.45. To ensure the effect of the present embodiment, it is preferable that the lower limit value of the conditional Expression (2) is 0.40.

According to another embodiment, in the above mentioned zoom lens configuration comprised of the first lens group to the fourth lens group, the above mentioned conditional Expression (2) is satisfied, where f2 denotes a focal length of the second lens group G2, and f3 denotes a focal length of the third lens group G3. The upper limit value and the lower limit value of the conditional Expression (2) in this case are the same as above.

In the present embodiment, it is preferable that the following conditional Expression (3) is satisfied, where f1 denotes a focal length of the first lens group G1, and fw denotes a focal length of this zoom lens in the wide-angle end state.

$$3.5 < f1/fw < 5.0 \quad (3)$$

The conditional Expression (3) specifies an appropriate range of the focal length f1 of the first lens group G1 in order to secure the back focus and ensure image forming performance. If the condition exceeds the upper limit value of the conditional Expression (3), the total length and diameter of the zoom lens increase, which makes it difficult to turn this zoom lens into practical use. The fluctuation of the curvature of field also increases, which is not desirable. If the condition is below the lower limit value of the conditional Expression (3), back focus becomes short, and image forming performance in the telephoto end state, particularly spherical aberration, deteriorates.

To ensure the effect of the present embodiment, it is preferable that the upper limit value of the conditional Expression (3) is 4.0. To ensure the effect of the present embodiment, it is preferable that the lower limit value of the conditional Expression (3) is 3.6.

In the present embodiment, it is preferable that the thirty second lens group G32 is a cemented lens of a biconcave negative lens and a positive lens (a cemented lens of the lens L321 and lens L322 in FIG. 1). Then fluctuation of chromatic aberration on the image plane, when the thirty second lens G32 is decentered for vibration isolation, can be decreased.

In the present embodiment, it is preferable that the thirty second lens group G32 has an aspherical surface (surface number 24 in FIG. 1). It is especially preferable that the negative lens included in the thirty second lens group G32 (lens L322 in FIG. 1) has an aspherical surface. Then fluctuation of the decentering coma aberration, when the thirty second lens group G32 is decentered for vibration isolation, can be decreased.

In the present embodiment, it is preferable that the thirty second lens group G32 is a cemented lens of a biconcave negative lens and a positive lens (see FIG. 5). Particularly in the present embodiment, it is preferable that the thirty second lens group G32 is a cemented lens of, in order from the object, a biconcave negative lens and a positive meniscus lens having a convex surface facing the object, or a cemented lens of, in order from the object, a positive meniscus lens having a convex surface facing the image and a biconcave lens. Then fluctuation of chromatic aberration on the Image plane, when the thirty second lens group G32 is decentered for vibration isolation, can be decreased.

In the present embodiment, it is preferable that the fourth lens group G4 has a positive lens disposed closest to the object (lens L41 in FIG. 1) and at least one cemented lens (cemented lens of the lens L43 and lens L44 in FIG. 1). Then the divergent bundle of rays from the third lens group G3 can be quickly converged, and an increase in size of the fourth lens group G4 can be suppressed, and fluctuation of coma aberration in the wide-angle end state can be decreased.

It is more preferable that the lens surface closest to the object of the fourth lens group G4 (surface number 25 in FIG. 1) is an aspherical surface, then not only is coma aberration decreased, but fluctuation on the image plane due to zooming can be corrected well. Thereby deterioration of performance, when the thirty second lens group is decentered for vibration isolation, can be further decreased.

In the present embodiment, it is preferable that, upon zooming from the wide-angle end state to the telephoto end state, the first lens group G1, the third lens group G3 and the fourth lens group G4 move toward the object. Then the zooming efficiency can be increased.

In the present embodiment, it is preferable that the air space between the third lens group G3 and the fourth lens group G4 in the wide-angle end state is greater than the air space between the third lens group G3 and the fourth lens group G4 in the telephoto end state. Then fluctuation on the image plane due to zooming, particularly the curvature of field in mid-position, can be decreased.

Figure 9:
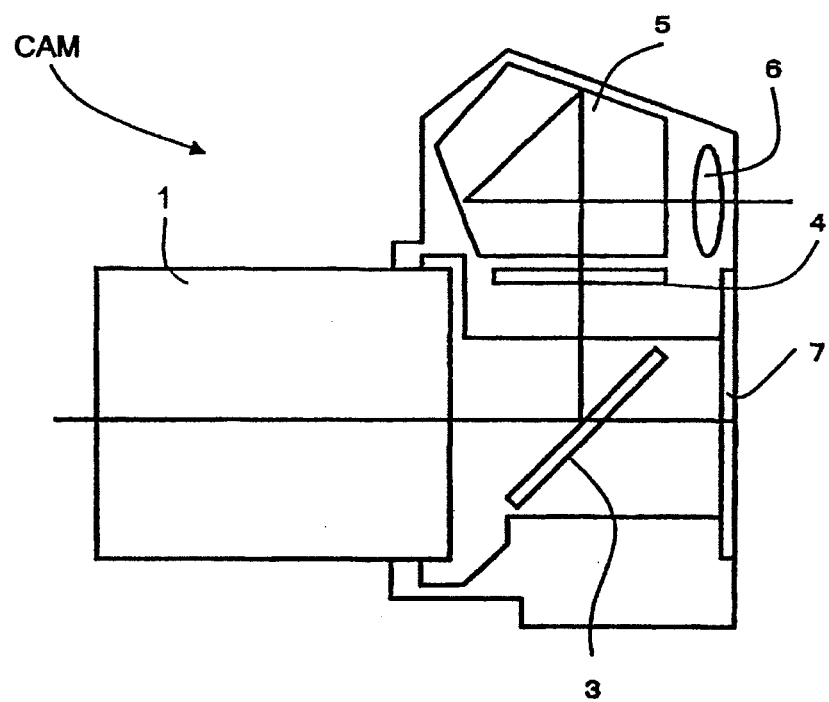
FIG. 9 illustrates a cross-sectional view depicting a digital single lens reflex camera having the zoom lens with the above configuration.

FIG. 9 shows a cross-sectional view of a digital single lens reflex camera CAM (optical apparatus) having a zoom lens with the above configuration as a camera lens 1. In the digital single lens reflex camera CAM shown in FIG. 9, lights from an object, which is not illustrated, are collected by the camera lens 1, and form an image on a focal plane plate 4 via a quick return mirror 3. The lights which formed an image on the focal plane plate 4 are reflected a plurality of times in a penta prism 5, and guided to an eye piece 6. Thereby the user can observe the object image as an upright image via the eye piece 6.

If the user presses a release button, which is not illustrated, the quick return mirror 3 is retracted out of the optical path, and the lights of the object, which is not illustrated, collected by the camera lens 1 form an object image on a picture element 7. Thus the lights from the object are captured by the picture element 7, and recorded in a memory, which is not illustrated, as an object image. In this way, the user can photograph an object using this camera CAM. The camera CAM in FIG. 9 may removably hold the camera lens 1, or may be integrated with the camera lens 1. The zoom lens of the present embodiment can ensure sufficient length of back focus, and the camera CAM may be a single lens reflex camera, or a camera which has no quick return mirror.

EXAMPLES

Each example according to the present embodiment will now be described with reference to the drawings. Table 1 and Table 2 shown below are tables listing the values of data according to Example 1 and Example 2. In [General Data], f is a focal length, FNO is an F number, and 2ω is an angle of view. In [Lens Data], the surface number shows a sequence of the lens surface counted from the object side along the light traveling direction, r is a radius of curvature of each lens surface, d is a distance from each optical surface to the next optical surface (or image plane) on the optical axis, vd is an Abbe number at d-line, and nd is a refractive index at d-line (wavelength: 587.6 nm). "*" attached at the surface number indicates that this lens surface is aspherical, and the column of the radius of curvature r shows a paraxial radius of curvature. "0.000" in the radius of curvature indicates a plane or an aperture. The refractive index of air "1.00000" is omitted. In [Variable Distance Data], f is a focal length of this zoom lens, Di (i is an integer) is a variable distance from the i-th surface to the next lens surface, and Bf is back focus. In [Focal Length Data of Each Group], the first surface and focal length of each group are shown. In [Conditional Expression Correspondence Value], values corresponding to the conditional Expressions (1) to (3) are shown.

In [Aspherical Data], the shape of the aspherical surface shown in [Lens Data] is given by the following Expression (a). In the following Expression (a), y denotes the height in a direction perpendicular to the optical axis, S(y) denotes a distance (sag) from a tangential plane at a vertex of the aspherical surface to a position on the aspherical surface at height y along the optical axis, r denotes a radius of curvature (paraxial radius of curvature) of a reference spherical surface, K denotes a conical coefficient, and An denotes an aspherical coefficient in degree n. In each example, the aspherical coefficient A2 of degree 2 is 0, which is omitted here. En means× 10ⁿ. For example, 1.234E−05=1.234×10⁻⁵.

$$S(y)=(y^2/r)/\{1+(1-Ky^2/r^2)^{1/2}\}+A4xy^4+A6xy^6+A8xy^8+A10xy^{10}+A12xy^{12} \quad (a)$$

In the table, "mm" is normally used for the unit of focal length f, radius of curvature r, surface distance d and other lengths. However, the unit is not limited to "mm" and another appropriate unit may be used instead, since an equivalent optical performance is obtained even if an optical system is proportionally expanded or proportionally reduced.

The description on the table is the same for other examples, where description thereof is omitted.

Example 1

Example 1 will be described with reference to FIG. 1 to FIG. 4 and Table 1. FIG. 1 is a diagram depicting a configuration of a lens according to Example 1, and show a wide-angle end state (W), intermediate focal length state (M), and telephoto end state (T) in order from the top. As FIG. 1 shows, a zoom lens according to Example 1 has, in order from an object, a first lens group G1 having positive refractive power, a second lens group G2 having negative refractive power, a third lens group G3 having positive refractive power, and a fourth lens group G4 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23 and a negative meniscus lens L24 having a concave surface facing the object. The negative meniscus lens L21 disposed closest to the object among the second lens group G2 is an aspherical lens of which aspherical surface is the lens surface at the object side.

The third lens group G3 has, in order from the object, a thirty first lens group G31 having positive refractive power, and a thirty second lens group G32 having negative refractive power, and is used for correcting hand motion blur (vibration isolation) by moving the thirty second lens group G32 so as to have components orthogonal to the optical axis.

The thirty first lens group G31 has, in order from the object, a biconvex positive lens L311, a biconvex lens L312, and a cemented lens of a biconvex positive lens L313 and a biconcave negative lens L134. The thirty second lens group G32 has, a cemented lens of, in order from the object, a positive meniscus lens L321 having a convex surface facing the image and a biconcave negative lens L322. The biconcave negative lens L322 disposed closest to the image among the thirty second lens group G32 is an aspherical lens of which aspherical surface is the lens surface at the image side.

The fourth lens group G4 has, in order from the object, a biconvex positive lens L41, a negative lens L42 having a convex surface facing the object, and a cemented lens of a biconvex positive lens L43 and a negative meniscus lens L44 having a convex surface facing the image. The biconvex positive lens L41 disposed closest to the image among the fourth lens group G4 is an aspherical lens of which aspherical surface is the lens surface at the object side.

In the zoom lens according to this example which has this configuration, upon zooming from a wide-angle end state to a telephoto end state, the first lens group G1, third lens group G3 and fourth lens group G4 move to the object so that the air space between the first lens group G1 and the second lens group G2 increases, the air space between the second lens group G2 and the third lens group G3 decreases, and the air space between the third lens group G3 and the fourth lens group G4 decreases. The second lens group G2 moves toward the object first, then moves toward the image.

An aperture stop S is disposed between the second lens group G2 and the third lens group G3, and moves together with the thirty first lens group G31 upon zooming from the wide-angle end state to the telephoto end state.

According to Example 1, in order to correct an angle θ of rotation blur, the moving lens group for blur correction is moved so as to have components orthogonal to the optical axis by (f·tan θ)/K, where f is a focal length of the zoom lens, and K is a ratio of the moving distance of the image on the image forming surface to the moving distance of the moving lens group, that is a vibration isolation coefficient, in the blur correction. In the wide-angle end state of Example 1, the vibration isolation coefficient is 1.034, and the focal length is 28.80 (mm), so the moving distance of the thirty second lens group G32 for correcting a 0.59° rotation blur is 0.282 (mm). In the telephoto end state of Example 1, the vibration isolation coefficient is 2.204, and the focal length is 292.0 (mm), so the moving distance of the thirty second lens group G32 for correcting a 0.19° rotation blur is 0.432 (mm).

Table 1 shows each data of the zoom lens according to Example 1. The surface numbers 1 to 31 in Table 1 correspond to the surfaces 1 to 31 in FIG. 1.

TABLE 1

[General Data]

|  | Wide-angle end state | Intermediate focal length state | Telephoto end state |
|---|---|---|---|
| f | 28.80 ~ | 100.0 ~ | 292.0 |
| FNO | 3.61 ~ | 5.16 ~ | 5.87 |
| 2ω | 76.3 ~ | 23.6 ~ | 8.2 |

[Lens Data]

| Surface number | r | d | vd | nd |
|---|---|---|---|---|
| 1 | 138.374 | 2.00 | 32.3 | 1.85026 |
| 2 | 69.100 | 9.60 | 82.5 | 1.49782 |
| 3 | −614.820 | 0.10 |  |  |
| 4 | 64.544 | 6.70 | 67.9 | 1.59319 |
| 5 | 381.843 | D5 |  |  |
| *6 | 142.335 | 1.00 | 42.7 | 1.83481 |
| 7 | 19.500 | 6.70 |  |  |
| 8 | −38.699 | 1.00 | 49.6 | 1.77250 |
| 9 | 89.261 | 0.10 |  |  |
| 10 | 41.755 | 4.80 | 23.8 | 1.84666 |
| 11 | −36.916 | 1.07 |  |  |
| 12 | −25.585 | 1.00 | 46.6 | 1.80400 |
| 13 | −739.100 | D13 |  |  |
| 14 | 0.000 | 0.50 | (Stop S) |  |
| 15 | 45.269 | 3.30 | 46.6 | 1.81600 |
| 16 | −253.290 | 0.10 |  |  |
| 17 | 46.089 | 3.20 | 65.5 | 1.60300 |
| 18 | −580.837 | 0.10 |  |  |
| 19 | 32.415 | 4.90 | 82.6 | 1.49782 |
| 20 | −45.043 | 1.00 | 23.8 | 1.84666 |
| 21 | 68.276 | 3.46 |  |  |
| 22 | −104.946 | 2.95 | 25.7 | 1.78472 |
| 23 | −28.646 | 1.00 | 49.5 | 1.74443 |
| *24 | 55.403 | D24 |  |  |
| *25 | 39.560 | 4.40 | 61.2 | 1.58913 |
| 26 | −37.069 | 0.10 |  |  |
| 27 | 83.477 | 1.50 | 25.7 | 1.78472 |
| 28 | 36.395 | 2.10 |  |  |

TABLE 1-continued

| 29 | 89.675 | 7.60 | 40.8 | 1.58144 |
|---|---|---|---|---|
| 30 | −14.341 | 1.50 | 46.6 | 1.81600 |
| 31 | −120.866 | Bf |  |  |

[Aspherical Data]

Sixth surface

κ = −5.9513, A4 = 3.1708E−06, A6 = −8.3003E−09, A8 = 6.2568E−11, A10 = −1.4653E−13, A12 = 2.7995E−16
Twenty fourth surface κ = 1.1502, A4 = −3.2253E−06, A6 = −8.4832E−09, A8 = 2.0857E−11, A10 = 0.0000E+00, A12 = 0.0000E+00
Twenty fifth surface κ = 1.2459, A4 = −1.1565E−05, A6 = 7.7439E−09, A8 = 5.7384E−11, A10 = 0.0000E+00, A12 = 0.0000E+00

[Variable Distance Data]

|  | Wide-angle end state | Intermediate focal length state | Telephoto end state |
|---|---|---|---|
| f | 28.8 | 100.0 | 292.0 |
| D5 | 2.62 | 34.44 | 59.31 |
| D13 | 28.91 | 12.89 | 1.47 |
| D24 | 7.65 | 3.34 | 2.25 |
| BF | 38.84 | 76.40 | 96.07 |

[Focal Length Data of Each Group]

| Group number | First surface of group | Focal length of group |
|---|---|---|
| G1 | 1 | 106.0 |
| G2 | 6 | −16.8 |
| G3 | 15 | 43.3 |
| G4 | 25 | 67.5 |

[Conditional Expression Correspondence Value]

Conditional Expression (1) |X1|/fw = 2.82
Conditional Expression (2) (−f2)/f3 = 0.40
Conditional Expression (3) f1/fw = 3.66

As shown in the data table in Table 1, the zoom lens according to Example 1 satisfies all the conditional Expression (1) to (3).

Figure 2B:
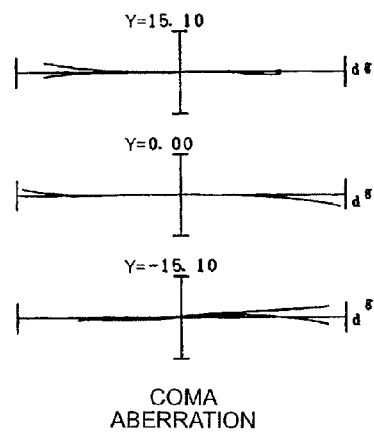
Figure 4A:
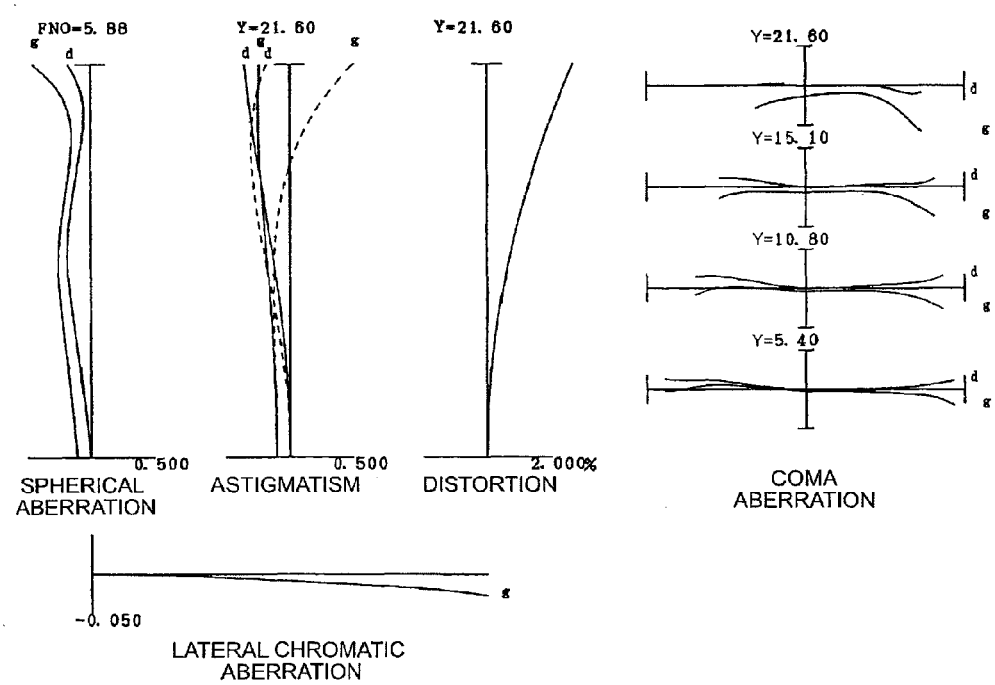
FIG. 4A and FIG. 4B illustrate graphs showing various aberrations of the zoom lens according to Example 1 upon focusing on infinity in the telephoto end state, and graphs showing coma aberrations when a 0.19° rotation blur is corrected.
Figure 4B:
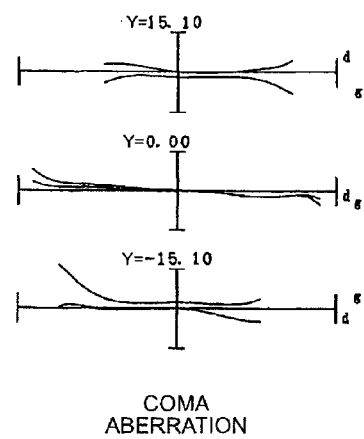

FIG. 2A and FIG. 2B are graphs showing various aberrations of the zoom lens according to Example 1 upon focusing on infinity in the wide-angle end state, and graphs showing coma aberrations when a 0.59° rotation blur is corrected. FIG. 3 illustrates graphs showing various aberrations of the zoom lens according to Example 1 upon focusing on infinity in the intermediate focal length state. FIG. 4A and FIG. 4B are graphs showing various aberrations of the zoom lens according to Example 1 upon focusing on infinity in the telephoto end state, and graphs showing coma aberrations when a 0.19° rotation blur is corrected.

In each graph showing aberration, FNO is an F number and Y is an image height (unit: mm). In the graphs showing spherical aberration, a value of the F number corresponding to the maximum aperture is shown; in the graphs showing astigmatism and graphs showing distortion, a maximum value of the image height is shown respectively; and in graphs showing coma aberration, a value of each image height is shown. d indicates various aberrations at d-line (wavelength: 587.6 nm), and g indicates various aberrations at g-line (wavelength: 435.8 nm), and no indication indicates various aberrations at d-line. In the graphs showing astigmatism, the solid line indicates the sagittal image surface, and the dotted line indicates the meridional image surface. The description on the graphs showing aberrations is the same for other examples.

As each graph showing aberrations clarifies, the zoom lens according to Example 1 has about an ×10 zoom ratio, a 70° or more angle of view in the wide-angle end state, and has excellent image forming performance that corrects various aberrations well in each focal length state from the wide-angle end state to the telephoto end state.

Example 2

Example 2 will be described with reference to FIG. 5 to FIG. 8 and Table 2. FIG. 5 is a diagram depicting a configuration of a lens according to Example 2, and show a wide-angle end state (W), intermediate focal length state (M), and telephoto end state (T) in order from the top. As FIG. 5 shows, a zoom lens according to Example 2 has, in order from an object, a first lens group G1 having positive refractive power, a second lens group G2 having negative refractive power, a third lens group G3 having positive refractive power, and a fourth lens group G4 having positive refractive power.

The first lens group G1 has, in order from the object, a cemented lens of a negative meniscus lens L11 having a convex surface facing the object and a biconvex positive lens L12, and a positive meniscus lens L13 having a convex surface facing the object.

The second lens group G2 has, in order from the object, a negative meniscus lens L21 having a convex surface facing the object, a biconcave negative lens L22, a biconvex positive lens L23 and a biconcave negative lens L24 having a concave surface facing the object. The negative meniscus lens L21 disposed closest to the object among the second lens group G2 is an aspherical lens of which glass lens surface on the object side is provided with a resin layer.

The third lens group G3 has, in order from the object, a thirty first lens group G31 having positive refractive power, and a thirty second lens group G32 having negative refractive power, and is used for correcting hand motion blur (vibration isolation) by moving the thirty second lens group G32 so as to have components orthogonal to the optical axis.

The thirty first lens group G31 has, in order from the object, a biconvex positive lens L311, and a cemented lens of a biconvex positive lens L312 and a biconcave negative lens L313. The thirty second lens group G32 has, a cemented lens of, in order from the object, a biconcave negative lens L321 and a positive meniscus L322 lens having a convex surface facing the object.

The fourth lens group G4 has, in order from the object, a biconvex positive lens L41, a cemented lens of a biconvex positive lens L42 of a biconvex positive lens L42 and a biconcave negative lens L473 and a positive lens L44 having a convex surface facing the image. The biconvex positive lens L41 disposed closest to the image among the fourth lens group G4 is an aspherical lens of which aspherical surface is the lens surface at the object side.

In the zoom lens according to this example which has this configuration, upon zooming from a wide-angle end state to a telephoto end state, the first lens group G1, third lens group G3 and fourth lens group G4 move to the object so that the air space between the first lens group G1 and the second lens group G2 increases, the air space between the second lens group G2 and the third lens group G3 decreases, and the air space between the third lens group G3 and the fourth lens group G4 decreases. The second lens group G2 moves toward the object first, then moves toward the image.

An aperture stop S is disposed between the second lens group G2 and the third lens group G3, and moves together with the thirty first lens group G31 upon zooming from the wide-angle end state to the telephoto end state.

According to Example 2, in order to correct an angle θ of rotation blur, the moving lens group for blur correction is moved so as to have components orthogonal to the optical axis by (f·tan θ)/K, where f is a focal length of the zoom lens, and K is a ratio of the moving distance of the image on the image forming surface to the moving distance of the moving lens group, that is a vibration isolation coefficient, in the blur correction. In the wide-angle end state of Example 2, the vibration isolation coefficient is 0.789, and the focal length is 28.80 (mm), so the moving distance of the thirty second lens group G32 for correcting a 0.59° rotation blur is 0.370 (mm). In the telephoto end state of Example 2, the vibration isolation coefficient is 1.638, and the focal length is 292.0 (mm), so the moving distance of the thirty second lens group G32 for correcting a 0.19° rotation blur is 0.583 (mm).

Table 2 shows each data of the zoom lens according to Example 2. The surface numbers 1 to 30 in Table 2 correspond to the surfaces 1 to 30 in FIG. 5.

TABLE 2

[General Data]

| | Wide-angle end state | Intermediate focal length state | Telephoto end state |
|---|---|---|---|
| f | 28.80 ~ | 100.0 ~ | 292.0 |
| FNO | 3.52 ~ | 5.23 ~ | 5.87 |
| 2ω | 76.3 ~ | 23.6 ~ | 8.2 |

[Lens Data]

| Surface number | r | d | νd | nd |
|---|---|---|---|---|
| 1 | 136.714 | 2.00 | 32.34 | 1.85026 |
| 2 | 64.523 | 9.38 | 82.52 | 1.49782 |
| 3 | −1208.949 | 0.10 | | |
| 4 | 64.486 | 7.48 | 65.44 | 1.60300 |
| 5 | 562.453 | D5 | | |
| *6 | 123.462 | 0.05 | 38.09 | 1.55389 |
| 7 | 99.219 | 1.00 | 46.62 | 1.81600 |
| 8 | 17.885 | 5.87 | | |
| 9 | −36.477 | 1.00 | 46.62 | 1.81600 |
| 10 | 125.973 | 0.10 | | |
| 11 | 38.196 | 4.49 | 23.77 | 1.84666 |
| 12 | −35.498 | 1.00 | | |
| 13 | −24.440 | 1.00 | 46.62 | 1.81600 |
| 14 | 4961.248 | D14 | | |
| 15 | 0.000 | 0.50 | (Stop S) | |
| 16 | 38.660 | 4.28 | 55.79 | 1.70027 |
| 17 | −64.767 | 0.10 | | |
| 18 | 28.095 | 5.79 | 82.52 | 1.49782 |
| 19 | −31.008 | 1.00 | 23.77 | 1.84666 |
| 20 | 173.822 | 2.56 | | |
| 21 | −159.081 | 1.00 | 36.06 | 1.70809 |
| 22 | 17.328 | 3.80 | 25.42 | 1.80518 |
| 23 | 51.582 | D24 | | |
| 24 | 47.087 | 4.89 | 33.11 | 1.64431 |
| *25 | −29.683 | 0.10 | | |
| 26 | 52.252 | 5.82 | 70.23 | 1.48749 |
| 27 | −20.000 | 1.00 | 40.70 | 1.8829 |
| 28 | 39.198 | 1.73 | | |
| 29 | 0.000 | 2.14 | 46.42 | 1.58267 |
| 30 | −100.220 | Bf | | |

[Aspherical Data]

Sixth surface

κ = 1.0000, A4 = 3.2821E−06, A6 = 3.6768E−09, A8 = −3.4596E−11, A10 = 2.7077E−13, A12 = 2.0135E−16

Twenty fifth surface

κ = 1.0000, A4 = −1.3777E−05, A6 = 5.1709E−09, A8 = −1.5922E−11, A10 = −1.8029E−14, A12 = 0.0000E+00

TABLE 2-continued

[Variable Distance Data]

|  | Wide-angle end state | Intermediate focal length state | Telephoto end state |
|---|---|---|---|
| f | 28.8 | 100.0 | 292.0 |
| D5 | 2.26 | 32.73 | 60.92 |
| D14 | 26.99 | 12.49 | 2.00 |
| D24 | 7.79 | 2.76 | 2.09 |
| BF | 38.04 | 77.81 | 90.08 |

[Focal Length Data of Each Group]

| Group number | First surface of group | Focal length of group |
|---|---|---|
| G1 | 1 | 105.5 |
| G2 | 6 | −17.4 |
| G3 | 16 | 43.3 |
| G4 | 24 | 57.0 |

[Conditional Expression Correspondence Value]

Conditional Expression (1) |X1|/fw = 2.78
Conditional Expression (2) (−f2)/f3 = 0.39
Conditional Expression (3) f1/fw = 3.68

As shown in the data table in Table 2, the zoom lens according to Example 2 satisfies all the conditional Expression (1) to (3).

Figure 6A:
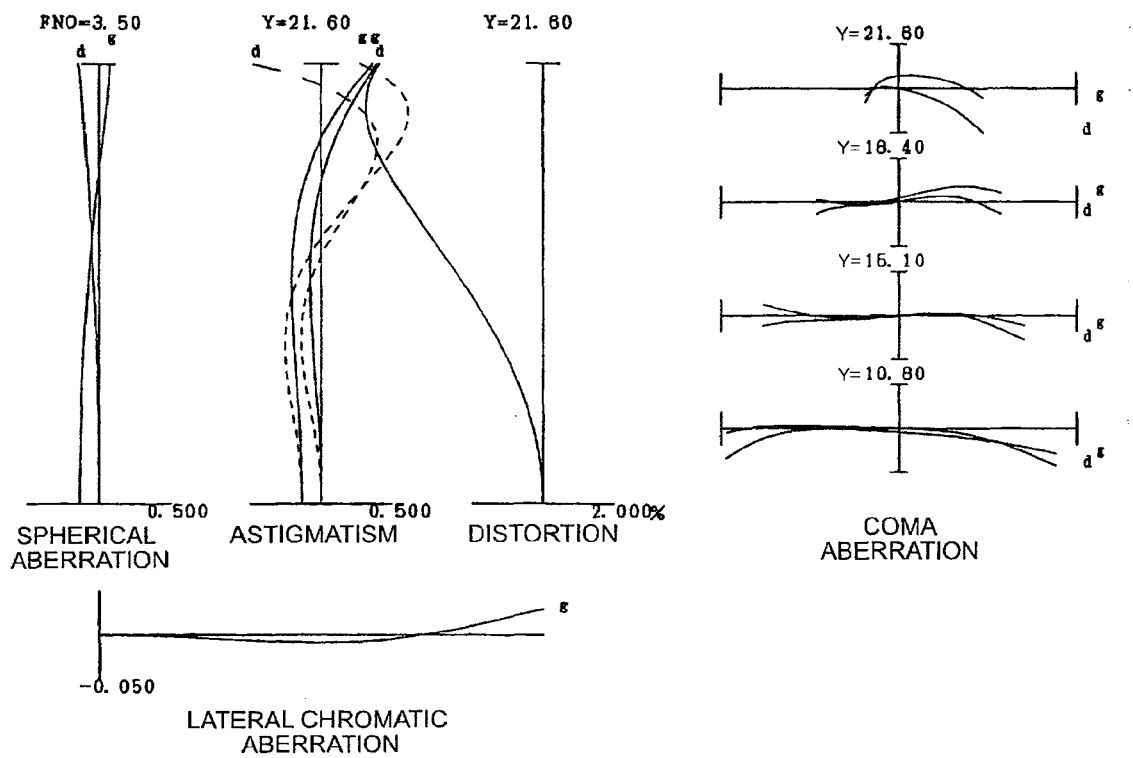
FIG. 6A and FIG. 6B illustrate graphs showing various Aberrations of the zoom lens according to Example 2 upon focusing on infinity in the wide-angle end state, and graphs showing coma aberrations when a 0.59° rotation blur is corrected.
Figure 6B:
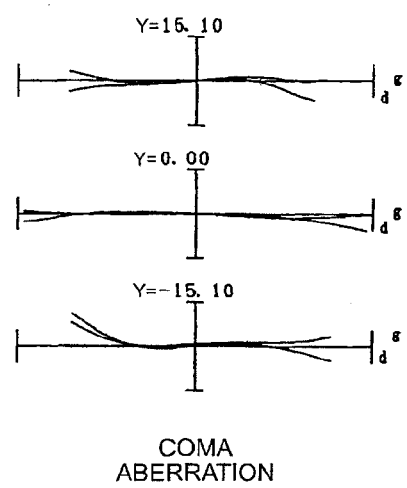
Figure 8A:
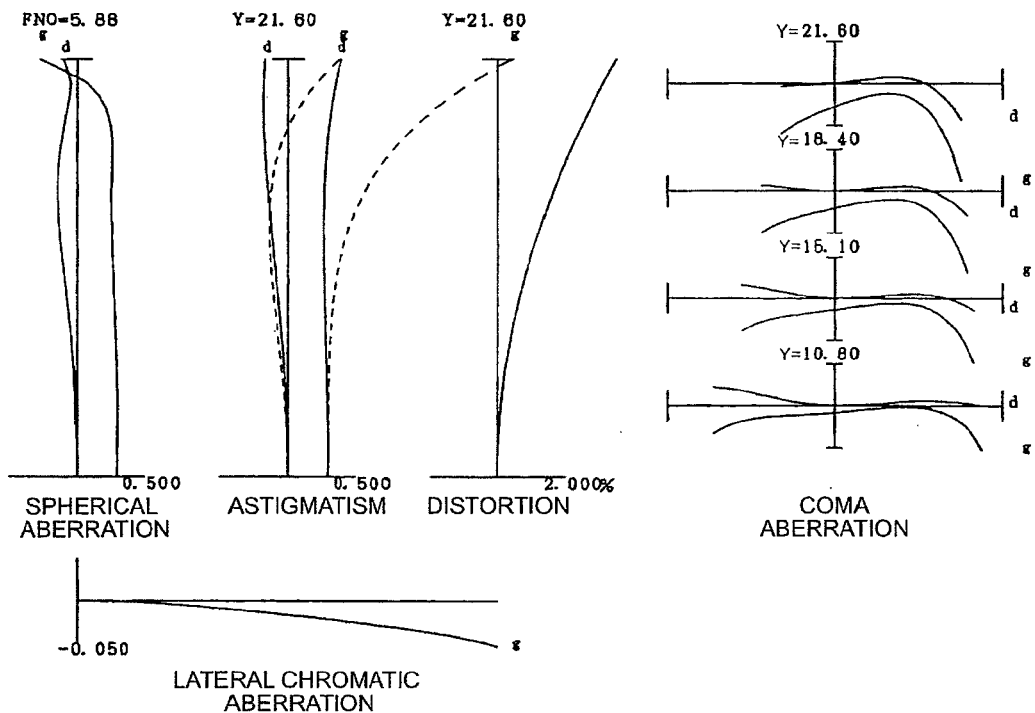
FIG. 8A and FIG. 8B illustrate graphs showing various aberrations of the zoom lens according to Example 2 upon focusing on infinity in the telephoto end state, and graphs showing coma aberrations when a 0.19° rotation blur is corrected.
Figure 8B:
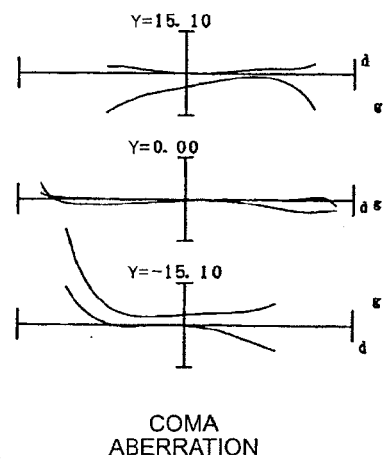

FIG. 6A and FIG. 6B are graphs showing various aberrations of the zoom lens according to Example 2 upon focusing on infinity in the wide-angle end state, and graphs showing coma aberrations when a 0.59° rotation blur is corrected. FIG. 7 are graphs showing various aberrations of the zoom lens according to Example 2 upon focusing on infinity in the intermediate focal length state. FIG. 8A and FIG. 8B are graphs showing various aberrations of the zoom lens according to Example 2 upon focusing on infinity in the telephoto end state, and graphs showing coma aberrations when a 0.19° rotation blur is corrected.

As each graph showing aberrations clarifies, the zoom lens according to Example 2 has about an ×10 zoom ratio, a 70° or more angle of view in the wide-angle end state, and has excellent image forming performance that corrects various aberrations well in each focal length state from the wide-angle end state to the telephoto end state.

In the above embodiment, the following content can be adopted within a range where the optical performance is not diminished.

In the above examples, a zoom lens formed of four lens groups was shown, but the present invention can also be applied to a configuration having a different number of lens groups, such as 5 or 6 lens groups. In concrete terms, a configuration where a positive or negative lens group is added to the side closest to the object, a configuration where a positive or negative lens group is added to the side closest to the image, or a configuration where a positive or negative lens group is added between the third group and fourth group, may be used.

A single or plurality of lens groups or a partial lens group may be designed to be a focusing lens group, which performs focusing from an object at infinity to an object at close distance by moving in the optical axis direction. This focusing lens group can be applied to auto focus, and is also suitable for driving a motor for auto focusing (e.g. driving using an ultrasonic motor). It is particularly preferable that the second lens group G2 is designed to be the focusing lens group.

A lens group or a partial lens group may be designed to be a vibration-isolating lens group, which corrects image blurs generated by hand motion, by vibrating the lens group or partial lens group in a direction perpendicular to the optical axis. It is particularly preferable that the thirty second lens group G32 is designed to be the vibration-isolating lens group, as mentioned above.

The lens surface may be formed to be a spherical surface or plane, or an aspherical surface. If the lens surface is a spherical surface or plane, then lens processing, assembly and adjustment are easy, and deterioration of optical performance, due to an error in processing, assembly and adjustment, can be prevented. Even if the image plane is shifted, the drawing performance is not affected very much, which is desirable. If the lens surface is an aspherical surface, the aspherical surface can be any one of an aspherical surface generated by grinding, a glass molded aspherical surface generated by forming glass in an aspherical shape using a die, and a composite aspherical surface generated by forming resin on the surface of the glass to be an aspherical shape. The lens surface may be a diffraction surface, and the lens may be a refractive index distributed lens (GRIN lens) or plastic lens.

It is preferable that the aperture stop S is disposed near the third lens group G3, but the role of the aperture stop may be substituted by the frame of the lens, without disposing a separate element as the aperture stop.

Each lens surface may be coated with an anti-reflection film which has high transmittance in a wide wavelength region, in order to decrease flares and ghosts, and implement a high optical performance with high contrast.

The zoom ratio of the zoom lens of the present embodiment is 5 to 18, and is preferably 8 to 12.

In the zoom lens of the present embodiment, it is preferable that the first lens group G1 has two positive lenses and one negative lens. In the first lens group G1, it is preferable that the lenses are disposed in the sequence of negative, positive and positive in order from the object.

In the zoom lens of the present embodiment, it is preferable that the second lens group G2 has one positive lens and three negative lenses. In the second lens group G2, it is preferable that the lenses are disposed in the sequence of negative, negative, positive and positive in order from the object.

In the zoom lens of the present embodiment, it is preferable that the third lens group G3 has three positive lenses and two negative lenses. In the third lens group G3, it is preferable that two positive lens components, which are fixed during vibration isolation, and one negative lens component, which can move during vibration isolation, are disposed in order from the object.

In the zoom lens of the present embodiment, it is preferable that the fourth lens group G4 has two positive lenses and one negative lens.

The embodiments were described with the configuration requirements to clarify the present invention, but needless to say, the present invention is not limited to these embodiments.

Now a method of manufacturing the zoom lens will be described with reference to FIG. 10. According to this method, the first lens group G1, second lens group G2, third lens group G3 and fourth lens group G4 of the present embodiment are assembled in a cylindrical lens barrel first (step S1). When each lens group is assembled in the lens barrel, each lens group may be disposed sequentially in the lens barrel one at a time in order along the optical axis, or part or all of the lens group may be integratedly held on a holding member, and then assembled in the lens barrel. Particularly in the present embodiment, the third lens group to the fifth lens group may be held on one holding member, and then assembled in the lens barrel. After assembling each lens group in the lens barrel, it is checked whether the object image is formed in a state where each lens group is assembled in the lens barrel, that is, it is checked whether the center of each lens group is aligned (step S2).

As mentioned above, various operations of the zoom lens are checked after the zoom lens is assembled (step S3). Examples of various operations are a zoom operation in which at least a part of the lens groups move along the optical axis upon zooming, a focusing operation in which a lens group, which performs focusing from an object at a long distance to an object at a short distance, moves along the optical axis, and a hand motion blur correction operation in which at least a part of the lenses moves so as to have components orthogonal to the optical axis. In the present embodiment, upon zooming from the wide-angle end state to the telephoto end state, each lens group moves so that the distance between the first lens group G1 and the second lens group G2 increases, the distance between the second lens group G2 and the third lens group G3 decreases, and the distance between the third lens group G3 and the fourth lens group G4 decreases. In the zoom lens of the present embodiment, upon zooming from the wide-angle end state to the telephoto end state, the first lens group G1 moves toward the object by the moving distance X1 along the optical axis direction. The sequence of checking the various operations is arbitrary.

EXPLANATION OF REFERENCE NUMERALS

G1 first lens group
G2 second lens group
G3 third lens group
G31 thirty first lens group (positive lens group)
G32 thirty second lens group (negative lens group)
G4 fourth lens group
S stop
I image plane
CAM digital signal lens reflex camera (optical apparatus)

What is claimed is:

1. A zoom lens, comprising, in order from an object, a first lens group having positive refractive power, a second lens group having negative refractive power, a third lens group having positive refractive power, and a fourth lens group having positive refractive power,
  a distance between each lens group being changed upon zooming from a wide-angle end state to a telephoto end state,
  the third lens group having, in order from the object, a positive lens group having positive refractive power and a negative lens group having negative refractive power, and having a configuration to move the negative lens group with components of movement orthogonal to the optical axis, and
  the following conditional expression being satisfied:

$$2.6 < |X1|/fw < 8.0$$

where X1 denotes a moving distance of the first lens group upon zooming from the wide-angle end state to the telephoto end state, and fw denotes a focal length of the zoom lens in the wide-angle end state.

2. The zoom lens according to claim 1, wherein the following conditional expression is satisfied:

$$0.38 < (-f2)/f3 < 0.50$$

where f2 denotes a focal length of the second lens group, and f3 denotes a focal length of the third lens group.

3. A zoom lens, comprising, in order from an object, a first lens group having positive refractive power, a second lens group having negative refractive power, a third lens group having positive refractive power, and a fourth lens group having positive refractive power,
  a distance between each lens group being changed, upon zooming from a wide-angle end state to a telephoto end state,
  the third lens group having, in order from the object, a positive lens group having positive refractive power and a negative lens group having negative refractive power, and having a configuration to move the negative lens group with components of movement orthogonal to the optical axis, and
  the following conditional expression being satisfied:

$$0.38 < (-f2)/f3 < 0.50$$

where f2 denotes a focal length of the second lens group, and f3 denotes a focal length of the third lens group.

4. The zoom lens according to claim 1, wherein the following conditional expression is satisfied:

$$3.5 < f1/fw < 5.0$$

where f1 denotes a focal length of the first lens group, and fw denotes a focal length of the zoom lens in the wide-angle end state.

5. The zoom lens according to claim 1, wherein the negative lens group is a cemented lens of a biconcave negative lens and a positive lens.

6. The zoom lens according to claim 1, wherein the negative lens group has an aspherical surface.

7. The zoom lens according to claim 1, wherein the negative lens group has a negative lens and the negative lens has an aspherical surface.

8. The zoom lens according to claim 1, wherein the negative lens group is a cemented lens of, in order from the object, a biconcave negative lens and a positive meniscus lens having a convex surface facing the object, or a cemented lens of, in order from the object, a positive meniscus lens having a convex surface facing an image and a biconcave negative lens.

9. The zoom lens according to claim 1, wherein the fourth lens group comprises a positive lens disposed closest to the object and at least one cemented lens.

10. The zoom lens according to claim 1, wherein the first lens group, the third lens group and the fourth lens group move to the object side upon zooming from the wide-angle end state to the telephoto end state.

11. The zoom lens according to claim 1, wherein, upon zooming from the wide-angle end state to the telephoto end state, the distance between the first lens group and the second lens group increases, the distance between the second lens group and the third lens group decreases, and the distance between the third lens group and the fourth lens group changes.

12. The zoom lens according to claim 1, wherein the air space between the third lens group and the fourth lens group in the wide-angle end state is greater than the air space between the third lens group and the fourth lens group in the telephoto end state.

13. An optical apparatus comprising the zoom lens according to claim 1.

14. A method of manufacturing a zoom lens, comprising:
  a step of disposing in a lens barrel, in order from an object, a first lens group having positive refractive power, a second lens group having negative refractive power, a third lens group having positive refractive power, and a fourth lens group having positive refractive power, and assembling these lens groups so that the distance between each lens group is changed, upon zooming from a wide-angle end state to a telephoto end state; and a step of constructing the third lens group by disposing, in order from the object, a positive lens group having positive refractive power and a negative lens group having negative refractive power, and assembling the same so that the negative lens group moves with components of movement orthogonal to the optical axis, the following expression being satisfied in the assembling step:

$$2.6<|X1|/fw<8.0$$

where X1 denotes a moving distance of the first lens group upon zooming from the wide-angle end state to the telephoto end state, and fw denotes a focal length of the zoom lens in the wide-angle end state.

15. The method of manufacturing a zoom lens according to claim 14, wherein the following conditional expression is satisfied:

$$0.38<(-f2)/f3<0.50$$

where f2 denotes a focal length of the second lens group, and f3 denotes a focal length of the third lens group.

16. A method of manufacturing a zoom lens, comprising:
a step of disposing, in order from an object, a first lens group having positive refractive power, a second lens group having negative refractive power, a third lens group having positive refractive power, and a fourth lens group having positive refractive power, and assembling these lens groups so that the distance between each lens group is changed, upon zooming from a wide-angle end state to a telephoto end state; and a step of constructing the third lens group by disposing, in order from the object, a positive lens group having positive refractive power and a negative lens group having negative refractive power, and assembling the same so that the negative lens group moves with components of movement orthogonal to the optical axis, the following conditional expression being satisfied:

$$0.38<(-f2)/f3<0.50$$

where f2 denotes a focal length of the second lens group, and f3 denotes a focal length of the third lens group.

17. The method of manufacturing a zoom lens according to claim 14, wherein the following conditional expression is satisfied:

$$3.5<f1/fw<5.0$$

where f1 denotes a focal length of the first lens group, and fw denotes a focal length of the zoom lens in the wide-angle end state.

18. The method of manufacturing a zoom lens according to claim 14, wherein the negative lens group is a cemented lens of a biconcave negative lens and a positive lens.

19. The method of manufacturing a zoom lens according to claim 14, wherein the negative lens group has an aspherical surface.

20. The method of manufacturing a zoom lens according to claim 14, wherein the negative lens group has a negative lens and the negative lens has an aspherical surface.

21. The method of manufacturing a zoom lens according to claim 14, wherein the negative lens group is a cemented lens of, in order from the object, a biconcave negative lens and a positive meniscus lens having a convex surface facing the object, or a cemented lens of, in order from the object, a positive meniscus lens having a convex surface facing an image and a biconcave negative lens.

22. The method of manufacturing a zoom lens according to claim 14, wherein the fourth lens group comprises a positive lens disposed closest to the object and at least one cemented lens.

23. The method of manufacturing a zoom lens according to claim 14, wherein the first lens group, the third lens group and the fourth lens group move to the object side upon zooming from the wide-angle end state to the telephoto end state.

24. The method of manufacturing a zoom lens according to claim 14, wherein upon zooming from the wide-angle end state to the telephoto end state, the distance between the first lens group and the second lens group increases, the distance between the second lens group and the third lens group decreases, and the distance between the third lens group and the fourth lens group changes.

25. The method of manufacturing a zoom lens according to claim 14, wherein an air space between the third lens group and the fourth lens group in the wide-angle end state is greater than an air space between the third lens group and the fourth lens group in the telephoto end state.

* * * * *